US005643680A

United States Patent [19]

Osaki et al.

[11] Patent Number: 5,643,680

[45] Date of Patent: Jul. 1, 1997

[54] HEAT-SENSITIVE MIMEOGRAPH STENCIL

[75] Inventors: Katsumasa Osaki, Otsu; Masaru Suzuki, Ito; Kenji Tsunashima, Kyoto; Mototada Fukuhara, Mishima, all of Japan

[73] Assignee: Toray Industries, Inc., Japan

[21] Appl. No.: 356,359

[22] PCT Filed: Apr. 22, 1994

[86] PCT No.: PCT/JP94/00677

§ 371 Date: Dec. 21, 1994

§ 102(e) Date: Dec. 21, 1994

[87] PCT Pub. No.: WO94/25285

PCT Pub. Date: Nov. 10, 1994

[30] Foreign Application Priority Data

Apr. 23, 1993 [JP] Japan .................................... 5-098085

[51] Int. Cl.$^6$ ...................................................... B32B 27/06

[52] U.S. Cl. .......................... 428/480; 428/195; 428/340; 428/411.1; 428/482; 428/902; 428/913; 156/231; 156/238; 156/244.24; 101/114; 442/287; 442/395

[58] Field of Search .................................... 428/137, 152, 428/195, 224, 233, 262, 265, 284, 290, 340, 341, 411.1, 480, 482, 902, 913, 914; 156/231, 238, 244.24, 253, 289; 101/114, 126, 127, 128.21, 128.4

[56] References Cited

U.S. PATENT DOCUMENTS

| | | | |
|---|---|---|---|
| 3,267,847 | 8/1966 | Hayama et al. . | |
| 4,606,964 | 8/1986 | Wideman | 428/152 |
| 4,891,258 | 1/1990 | Fahrenkrug | 428/138 |
| 4,961,377 | 10/1990 | Bando et al. | 101/128 |
| 4,981,746 | 1/1991 | Matsuo et al. | 428/195 |
| 5,061,565 | 10/1991 | Aoki et al. | 428/409 |
| 5,089,341 | 2/1992 | Yoshimura et al. | 428/412 |
| 5,133,919 | 7/1992 | Hasegawa et al. | 264/230 |
| 5,139,860 | 8/1992 | Mori | 428/264 |
| 5,262,221 | 11/1993 | Terada et al. | 428/195 |

FOREIGN PATENT DOCUMENTS

| | | |
|---|---|---|
| 592 215 | 4/1994 | European Pat. Off. . |
| 2 207 635 | 2/1989 | United Kingdom . |

OTHER PUBLICATIONS

JP 02-107488, Hane et al., Patent Abstracts of Japan, Grp. No. M0966, vol. 14, No. 319; Abs. Pub. Date Jul. 09, 1990.

JP 04-212891, Hashimoto, Patent Abstracts of Japan, Grp. No. M1340, vol. 16, No. 557, Abs Pub. Date Nov. 27, 1992.

*Primary Examiner*—William Krynski

*Attorney, Agent, or Firm*—Austin R. Miller

[57] ABSTRACT

A heat-sensitive mimeograph stencil which gives a high quality of image because the permeation of printing ink is not hindered by an adhesive, and which is free from the problems caused by an adhesive, that is, poor resistance to ink, sticking to thermal head, and generation of toxic chlorine, as well as production process thereof is disclosed. The heat-sensitive mimeograph stencil is prepared by thermally adhering a polyester film and a porous support consisting essentially of polyester fibers and then co-stretching the resultant, and the peeling strength between said polyester film and said porous support is not less than 1 g/cm, so that the printed matter obtained by mimeograph using the stencil has very high quality of image.

22 Claims, No Drawings

HEAT-SENSITIVE MIMEOGRAPH STENCIL

TECHNICAL FIELD

The present invention relates to a heat-sensitive mimeograph stencil and a process for producing the same, which is processed by a pulsatory irradiation such as flash irradiation, infrared irradiation or laser beam, or by contact with a thermal head, and which is subjected to rotary press printing or litho printing. More particularly, the present invention relates to a heat-sensitive mimeograph stencil which does not employ an adhesive and which is excellent in clarity of image and in film-forming property, as well as to a process for producing the same.

BACKGROUND ART

Heat-sensitive mimeograph stencils (hereinafter referred to as "stencils" for short) are known which comprise a thermoplastic film such as acrylonitrile-based film, polyester film, vinylidene chloride film or the like and a porous support such as a tissue paper mainly comprising natural fibers or synthetic fibers, a non-woven fabric or a woven fabric, which is adhered to the above-mentioned thermoplastic film. For example, Japanese Laid-open Patent Application (Kokai) No. 51-2512 discloses a stencil comprising an acrylonitrile-based film and an ink-permeable support adhered to the film; Japanese Laid-open Patent Application (Kokai) No. 51-2513 discloses a stencil comprising an oriented polyethylene terephthalate film and an ink-permeable support adhered to the film; and Japanese Laid-open Patent Application (Kokai) No. 57-182495 discloses a stencil comprising a polyester film and a porous tissue paper or a mesh sheet adhered to the film. Further, Japanese Laid-open Patent Application (Kokai) No. 2-107488 discloses a stencil comprising a thermoplastic film and a non-woven fabric mainly comprising synthetic fibers, which is adhered to the thermoplastic film.

However, these stencils are not necessarily satisfactory in the clarity of printed image. Although there may be various reasons therefor, one of the major causes is the so called white spots (the phenomenon that white defects are formed in the area painted in black). One of the causes of this phenomenon is that even when the film constituting the stencil is melted to form through openings, if the adhesive adhering the film with the support exists in the opened area, the permeation of the printing ink is inhibited by the adhesive and the points which constitute an image line on a printing paper cannot be formed.

Thus, in order to promote the printing quality and clarity of printed image, it is demanded to make the amount of the used adhesive as small as possible.

In response to this demand, various proposals have been made. For example, Japanese Laid-open Patent Application (Kokai) No. 58-147396 discloses a stencil comprising a net-like adhesive layer between a porous tissue paper and a synthetic resin film; and Japanese Laid-open Patent Application (Kokai) No. 4-232790 discloses a stencil in which the area of the adhesive is set within a specific range. However, by any of these methods, satisfactory results have not been obtained.

Further, the adhesives per se which are currently used also have problems. For example, acrylic resin-based adhesives and vinyl acetate resin-based adhesives have poor ink resistance because these adhesives are softened, swelled or dissolved in the printing ink. Curable adhesives have a drawback in that non-cured materials are likely to be formed, which are likely to be attached to the thermal head during processing. Chlorinated resin-based adhesives have a drawback in that toxic chlorine gas is liberated to the thermal head during processing.

Thus, a heat-sensitive mimeograph stencil which does not employ an adhesive at all is now desired.

To overcome these problems, Japanese Laid-open Patent Application (Kokai) No. 4-212891 proposes to form a heat-sensitive mimeograph stencil comprising a thermoplastic resin film and synthetic fibers scattered on one surface of the thermoplastic film, which are bonded to the film by thermocompression. However, with this method, if the adhesion between the resin film and the fiber layer is insufficient and so the peeling strength is small, the fiber layer is peeled off during transportation of the film, and the film is wrinkled or broken. Further, if fibers are bonded by a binder, the fibers are adhered to a heat roll so that films cannot be stably formed.

On the other hand, although Japanese Laid-open Patent Application (Kokai) Nos. 48-23865 and 49-34985 disclose thermally adhering a polyester film and a non-woven fabric and then subjecting the composite film to co-stretching, the composite film is not used as a heat-sensitive mimeograph stencil. Therefore, it is not disclosed that an excellent heat-sensitive mimeograph stencil is attained when the peeling strength is within a specific range.

DISCLOSURE OF THE INVENTION

An object of the present invention is to overcome the above-mentioned various problems in the prior art and to provide a heat-sensitive mimeograph stencil which does not employ an adhesive and which is excellent in clarity of image and in stability of film formation.

Another object of the present invention is to provide a process for producing the above-mentioned heat-sensitive mimeograph stencil.

That is, the present invention provides a heat-sensitive mimeograph stencil which is prepared by thermally adhering a polyester film and a porous support consisting essentially of polyester fibers and then co-stretching the resultant, the peeling strength between said polyester film and said porous support being not less than 1 g/cm.

The present invention also provides a process for producing a heat-sensitive mimeograph stencil comprising the steps of thermally adhering a polyester film and a porous support consisting essentially of polyester fibers and then co-stretching the resultant.

By virtue of the above-described constitution, the present invention exhibits the following effects.

That is, since it is not necessary to use an adhesive at all, permeation of the printing ink is not hindered by the adhesive. Therefore, the printed matter obtained by mimeograph printing using the stencil has very good image quality, and the degradation of ink resistance, adhesion to the thermal head, generation of toxic chlorine due to the adhesive can be prevented. Further, the stability in film-formation is also excellent.

BEST MODE FOR CARRYING OUT THE INVENTION

The polyester constituting the polyester film and the polyester fibers is a polyester containing as major constituents an aromatic dicarboxylic acid, alicyclic dicarboxylic acid or an aliphatic dicarboxylic acid, and a diol. Examples of the aromatic dicarboxylic acid component include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyletherdicarboxylic acid, 4,4'-diphenylsulfonedicarboxylic acid and the like. Among these, terephthalic acid, isophthalic acid, 2,6-naphthalenedicarboxylic acid and the like are preferred. Examples of the alicyclic dicarboxylic acid component include 1,4-cyclohexanedicarboxylic acid and the like. Examples of the aliphatic dicarboxylic acid component include adipic acid, suberic acid, sebacic acid, dodecanedione acid and the like. Among these, adipic acid and the like are preferred. These acid components may be employed individually or in combination. Further, a hydroxy acid and the like such as hydroxyethoxybenzoic acid and the like may be partially copolymerized. Examples of the diol component include ethylene glycol, 1,2-propanediol, 1,3-propanediol, neopentyl glycol, 1,3-butanediol, 1,4-butanediol 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2'-bis(4'-β-hydroxyethoxyphenyl)propane and the like. Among these, ethylene glycol, 1,6-hexanediol, 1,4-cyclohexanedimethanol, diethylene glycol and the like are preferred. These diol components may be employed individually or in combination.

Preferred examples of the polyesters constituting the polyester film include polyethylene terephthalates, copolymers of ethylene terephthalate and ethylene isophthalate, copolymers of hexamethylene terephthalate and cyclohexane dimethylene terephthalate, and the like. Among these, copolymers of ethylene terephthalate and ethylene isophthalate, and copolymers of hexamethylene terephthalate and cyclohexanedimethylene terephthalate, and the like are especially preferred.

Preferred examples of the polyesters constituting the polyester fibers include polyethylene terephthalates, polyethylene naphthalates, polycyclohexanedimethylene terephthalates, copolymers of ethylene terephthalate and ethylene isophthalate and the like. Among these, polyethylene terephthalates, polyethylene naphthalates and the like are especially preferred.

The polyesters employed in the present invention may be produced by conventional methods. For example, the polyesters may be produced by a method in which an acid component and a diol component are directly subjected to esterification reaction, and polycondensing the reaction product by heating the product under reduced pressure while removing excess diol component, or by a method in which a dialkyl ester is used as an acid component, this acid component and a diol component are subjected to ester exchange reaction, and the reaction product is polycondensed in the same manner as mentioned above. For the reaction, if necessary, a known catalyst such as alkaline metal, alkaline earth metal, manganese, cobalt, zinc, antimony, germanium, titanium or the like may be employed. Further, a phosphorus compound may be employed as a color protection agent.

As required, the polyester used in the present invention may contain a fire retardant, heat stabilizer, antioxidant, UV absorber, anti-static agent, pigment, dye, an organic lubricant such as an aliphatic ester, wax or the like, an anti-foaming agent such as polysiloxane or the like.

Depending on the use, the polyester may be provided with slipperiness. The method for giving slipperiness is not restricted. For example, a method in which inorganic particles made of clay, mica, titanium oxide, calcium carbonate, kaolin, talc, dry or wet silica or the like, or organic particles made of acrylic acids, styrene or the like are blended; a method in which so called non-incorporated particles which are precipitated catalyst that is added for the polycondensation reaction of the polyester; and a method in which a surfactant is applied may be employed.

The polyester fibers employed in the present invention may be produced by conventional methods using the above-described polyesters.

As the porous support consisting essentially of the polyester fibers employed in the present invention may be a tissue paper, non-woven fabric, woven fabric or the like which is produced from the above-described polyester fibers by a conventional method. Among these, non-woven fabric and woven-fabric are preferred. The polyester fibers used for the porous support may be of one type or a mixture of two or more types of fibers. As long as the good adhesion with the polyester film is attained, the polyester fibers may be used in combination with other synthetic fibers, regenerated fibers, semisynthetic fibers, natural fibers and/or inorganic fibers.

The phrase "prepared by thermally adhering a polyester film and a porous support consisting essentially of polyester fibers and then co-stretching the resultant" herein means that the porous support is supplied and thermally adhered to the polyester film during the film-forming process of the polyester film before or between the stretching steps, and the polyester film to which the porous support is adhered is then co-stretched. To merely thermally adhere the polyester film and the porous support is not preferred because the opening-forming property of the stencil is poor, the mechanical properties are poor or the adhesion is insufficient. By thermally adhering the film and the support before the stretching step and by co-stretching the adhered laminate, the adhesion is largely improved during the co-stretching step, probably because an active surface of the polyester may be newly formed by the co-stretching. Before the co-stretching, the film is preferably a non-oriented film or an oriented film having a low degree of orientation. Similarly, when a screen gauze or a non-woven fabric is used as the porous support, the fibers running in the direction parallel to the stretching direction are preferably non-oriented fibers or oriented fibers having a low degree of orientation. By thermally adhering the polyester film and the porous support consisting essentially of the polyester fibers and then co-stretching the laminate, at least ⅕ of the diameter of the fibers at the adhered portion is adhered with the film, so that the mechanical properties and adhesion are improved.

Needless to say, in cases where a non-woven fabric is used, the non-woven fabric may be continuously produced by the melt blown process or spun bond process, and the produced non-woven fabric may be supplied to the film-forming step without once being wound about a roll.

Although the method for the thermal adhering is not restricted, in order to promote the intimacy between the film and the porous support, thermocompression bonding by using a heat roll is preferred. The temperature during the thermal adhesion is preferably between the glass transition point (Tg) and the melting point (Tm) of the polyester film.

Uniaxial stretching or biaxial stretching may be employed. In the case of biaxial stretching, sequential biaxial stretching or simultaneous stretching may be employed. In the case of sequential biaxial stretching, although the stretching is usually performed in the longitudinal direction first and then in the transverse direction, this order may be reversed. In the case of sequential biaxial stretching, as mentioned above, the polyester film and the porous support consisting essentially of polyester fibers may be thermally adhered before the first stretching step or after the first stretching step and before the second stretching step. The stretching temperature may preferably be between Tg and the cold crystallization temperature (Tcc) of the polyester film. The stretching ratio is not restricted and may be appropriately selected based on the type of the polymer constituting the polyester film and on the sensitivity demanded for the stencil. Usually, a stretching ratio of 2.0–5.0 times the original length is preferred in either of the longitudinal or transverse direction. After biaxial stretching, the stencil may be stretched again in the longitudinal or transverse direction.

Thereafter, the stencil according to the present invention may be heatset. The conditions of the heatset are not restricted and may be appropriately selected depending on the type of the polymer constituting the polyester film. Usually, a temperature of 160°–240° C. and a duration of 0.5–60 seconds are preferred.

The heatset stencil may be once cooled to about room temperature and then aged at a relatively low temperature of 40°–90° C. for 10 minutes to 1 week. Such an aging treatment is especially preferred since the generation of curl and wrinkles during storage or in the printer can be reduced.

In the stencil according to the present invention obtained by thermally adhering the polyester film and the porous support and then co-stretching the resulting laminate, it is required that the peeling strength between the film and the porous support be not less than 1 g/cm, preferably not less than 3 g/cm, more preferably not less than 10 g/cm, still more preferably not less than 30 g/cm. If the peeling strength is smaller than 1 g/cm, the film is peeled from the porous support during the transportation of the film and the film is wrinkled or broken, so that stable film formation cannot be attained.

In the stencil according to the present invention obtained by thermally adhering the polyester film and the porous support and then co-stretching the resulting laminate, the thickness of the polyester film is not restricted and may be appropriately selected depending on the type of the polymer constituting the polyester film and the sensitivity demanded for the stencil. Usually, the thickness of the polyester film in the stencil is preferably 0.1–10 μm, more preferably 0.5–5.0 μm and more preferably 1.0–3.5 μm. If the thickness is more than 10 μm, the opening-forming property may be poor and if it is less than 0.1 μm, the stability of the film formation may be poor.

In the stencil according to the present invention obtained by thermally adhering the polyester film and the porous support and then co-stretching the resulting laminate, the basis weight of the fibers constituting the porous support is not restricted and may be appropriately selected depending on the type of the polymer constituting the polyester fibers, the fineness of the fibers and on the strength demanded for the stencil. Usually, a basis weight of 1–30 $g/m^2$ is preferred. The lower limit of the basis weight of the fibers is more preferably not less than 2 $g/m^2$, still more preferably not less than 3 $g/m^2$, still more preferably not less than 6 $g/m^2$, and still more preferably not less than 8 $g/m^2$. The upper limit of the basis weight of the fibers is more preferably not more than 20 $g/m^2$, still more preferably not more than 18 $g/m^2$, still more preferably not more than 15 $g/m^2$, still more preferably not more than 12 $g/m^2$. If the basis weight of the fibers is more than 30 $g/m^2$, clarity of image may be poor, and if it is less than 1 $g/m^2$, sufficient strength required for a support may not be obtained or the printing durability may be low, so that it is not preferred.

In the stencil according to the present invention obtained by thermally adhering the polyester film and the porous support and then co-stretching the resulting laminate, the fineness of the porous support is preferably 0.01–10 deniers, more preferably 0.05–5 deniers.

In cases where the porous support is a screen gauze, in the stencil according to the present invention obtained by thermally adhering the polyester film and the porous support and then co-stretching the resulting laminate, the size of the mesh in the porous support is not restricted. Usually, the size of the mesh is preferably 30–300-mesh, more preferably 80–250-mesh.

In cases where the openings are formed in the stencil by heating the polyester film with a thermal head or by another means, depending on the conditions, the polyester film may be fused and stuck to the thermal head or the like, so that the stable running of the stencil may be hindered. To overcome this problem, a known thermal melt sticking-preventing layer consisting essentially of a silicone oil, silicone resin, fluorine-contained resin, surfactant or the like may be formed.

Further, to give excellent anti-static property to the stencil, a known anti-static agent may be added to the thermal melt sticking-preventing layer.

Methods for measuring and evaluating the characteristics concerning the present invention will now be described.

(1) Stability in Film-formation

Sticking of the film to the heat roll, generation of wrinkles and breaking were observed.

(2) Peeling Strength

The film was backed with a cellophane tape and the peeling strength between the film and the porous support was measured by the T-shaped peeling test according to JIS-K-6854.

(3) Quality of Image of Stencil

An original carrying characters of JIS level 1 having a size of 2.0 mm×2.0 mm and symbols of "●" (circles painted in black) having a diameter of 1–5 mm was printed by using the heat-sensitive mimeograph stencil according to the present invention. The stencil was processed by a mimeograph "PRINTGOCCO" (manufactured by RISO KAGAKU KYOGO K.K.), and printing was carried out using the obtained stencil. The printed characters and symbols were evaluated according to the following criteria:

○: Irregularity in the thickness of characters and thin lines and white spots in the circles painted in black are not observed.

X: Characters and thin lines are partially cut or the thickness is irregular, and white spots in the circles painted in black are prominent.

Δ: The quality is between ○ and X and manages to be acceptable in practice.

The present invention will now be described in more detail by way of examples thereof. However, the present invention is not restricted to the examples.

Example 1

(Preparation of Porous Support)

Using oriented polyethylene terephthalate fibers (5 deniers) as warps and non-oriented polyethylene terephthalate fibers (18 deniers) as wefts, a screen gauze with 100-mesh in the longitudinal direction and 360-mesh in the transverse direction was prepared.

(Preparation of Stencil)

Using terephthalic acid as the acid component and 1,6-hexanediol (65 mol %) and 1,4-cyclohexanedimethanol (35 mol %) as the diol components, a copolymer containing hexamethylene terephthalate units and cyclohexanedimethylene terephthalate units was prepared by a conventional polycondensation process. After drying the obtained polyester copolymer, the copolymer was supplied to a melt extruder and was extruded into the form of a sheet through a die in the form of slit. The extruded sheet was cooled and solidified to obtain a non-oriented sheet, and the non-oriented sheet was stretched to 3.3 times original length in the longitudinal direction. The obtained longitudinally stretched sheet was thermally adhered with the above-mentioned screen gauze preliminarily prepared in line at 90° C. using a heat roll. The obtained laminate was co-stretched to 3.3 times the original length in the transverse direction and the resultant was then heatset at 100° C., thereby obtaining a stencil comprising a polyester film with a thickness of 2 μm and a porous support with a size of mesh of 100-mesh in both the longitudinal and transverse directions. The film surface of the stencil was coated with a silicone oil in an amount of 0.05 g/m$^2$ to obtain the final stencil.

(Evaluation Results)

As summarized in Tables 1 and 2, sticking to the heat roll, wrinkles, breakages and the like were not observed during film formation, and the film-forming property was good. The peeling strength of the obtained stencil was 40 g/cm. Using the finally obtained stencil, the quality of the image was evaluated by the above-described method. Irregularities in the thickness of thin lines were not observed and the printed image was clear. Further, white spots in the circles painted in black were not observed, and the evaluation of the quality of the printed image was "○".

Example 2

The same procedure as in Example 1 was repeated except that a screen gauze of which warps and wefts were non-oriented polyethylene terephthalate fibers (10 deniers), which had a mesh size of 360-mesh in both the longitudinal and transverse directions was employed as the porous support, and that the polyester film in the non-oriented stage was thermally adhered with the support, to obtain a stencil comprising a polyester film with a thickness of 2 μm and a porous support having a mesh size of 110-mesh in the longitudinal direction and 100-mesh in the transverse direction.

Similar to the stencil obtained in Example 1, the peeling strength was 55 g/cm and the film-forming property was good. The evaluation of the image quality of this stencil was also "○".

Example 3

Using terephthalic acid in an amount of 86 mol % and isophthalic acid in an amount of 14 mol % as the acid components, and ethylene glycol as the glycol component, a polyester copolymer containing ethylene terephthalate units and ethylene isophthalate units was prepared by a conventional polycondensation process. After drying the obtained polyester copolymer, the copolymer was supplied to a melt extruder and was extruded into the form of a sheet through a die in the form of slit. The extruded sheet was cooled and solidified to obtain a non-oriented sheet, and the non-oriented sheet was stretched to 3.3 times original length in the longitudinal direction. The obtained longitudinally stretched sheet was thermally adhered with the same screen gauze as used in Example 1 in line at 100° C. using a heat roll. The obtained laminate was co-stretched to 3.3 times original length in the transverse direction and the resultant was then heatset at 200° C., thereby obtaining a stencil comprising a polyester film with a thickness of 2 μm and a porous support with a size of mesh of 100-mesh in both the longitudinal and transverse directions. The film surface of the stencil was coated with a silicone oil in an amount of 0.05 g/m$^2$ to obtain the final stencil.

Similar to the stencil obtained in Example 1, the peeling strength was 35 g/cm and the film-forming property was good. The evaluation of the image quality of this stencil was also "○".

Comparative Example 1

Using oriented polyethylene terephthalate fibers (5 deniers), a screen gauze having a mesh size of 100-mesh in both the longitudinal and transverse directions was prepared. On the other hand, using the same polyester copolymer as used in Example 1, a polyester film with a thickness of 2 μm was prepared in the same manner as in Example 1 except that a screen gauze was not thermally adhered. The obtained polyester film was adhered with the screen gauze by an adhesive. The film surface of the stencil was coated with a silicone oil in an amount of 0.05 g/m$^2$ to obtain the final stencil.

Although the peeling strength was 60 g/cm and the film-forming property was good, white spots were observed in some of the circles painted in black and the evaluation of the image quality was "Δ".

Comparative Example 2

Using oriented polyethylene terephthalate fibers (5 deniers), a screen gauze having a mesh size of 100-mesh in both the longitudinal and transverse directions was prepared. On the other hand, using the same polyester copolymer as used in Example 1, a polyester film with a thickness of 2 μm was prepared in the same manner as in Example 1 except that a screen gauze was not thermally adhered. The obtained polyester film was directly adhered with the screen gauze by using a pressure roll without using an adhesive.

The peeling strength of the obtained stencil was less than 1 g/cm and wrinkles and breakages were observed during the transportation of the film.

Example 4

Polyethylene terephthalate material ([η]=0.5, melting point: 257° C.) was spun by melt blown process using a rectangular spinneret having 100 holes with a diameter of 0.35 mm at a spinneret temperature of 285° C. at an extrusion rate of 30 g/min. The spun fibers were collected on a conveyer and rolled to obtain a non-oriented non-woven fabric having a basis weight of 120 g/m$^2$.

Using terephthalic acid in an amount of 86 mol % and isophthalic acid in an amount of 14 mol % as the acid components, and ethylene glycol as the glycol component, a polyester copolymer containing ethylene terephthalate units and ethylene isophthalate units was prepared. The copolymer was supplied to a melt extruder and was extruded into the form of a sheet through a die in the form of slit. The extruded sheet was cooled and solidified to obtain a non-oriented sheet. The obtained non-oriented sheet was thermally adhered with the above-mentioned non-woven fabric preliminarily prepared in line at 90° C. using a heat roll. The obtained laminate was co-stretched to 3.3 times original length in the longitudinal direction and the resultant was then stretched to 3.6 times original length in the transverse direction, followed by heatset at 120° C., thereby obtaining a stencil comprising a polyester film with a thickness of 2 μm and a non-woven fabric with a basis weight of 10 g/m$^2$ and a fineness of 0.2 deniers. The film surface of the stencil was coated with a silicone oil in an amount of 0.05 g/m$^2$ to obtain the final stencil.

(Evaluation Results)

As summarized in Tables 1 and 2, sticking to the heat roll, wrinkles, breakages and the like were not observed during film formation, and the film-forming property was good. The peeling strength of the obtained stencil was 40 g/cm. Using the finally obtained stencil, the quality of the image was evaluated by the above-described method. Irregularities in the thickness of thin lines were not observed and the printed image was clear. Further, white spots in the circles painted in black were not observed, and the evaluation of the quality of the printed image was "○".

Example 5

The same procedure as in Example 4 was repeated except that the basis weight of the used non-woven fabric was 33 g/m$^2$ and the thermal adhering of the non-woven fabric was carried out after the longitudinal stretching and before the transverse stretching, to obtain a final stencil comprising a polyester film with a thickness of 2 μm and a non-woven fabric with a basis weight of 10 g/m$^2$ and a fineness of 0.5 deniers. Wrinkles and breakages during the film formation were not observed and the film-forming property was good. The peeling strength was 7 g/cm and the evaluation of the image quality of this stencil was also "○".

Comparative Example 3

Polyethylene terephthalate material ([η]=0.5, melting point: 257° C.) was spun by melt blown process using a rectangular spinneret having 100 holes with a diameter of 0.30 mm at a spinneret temperature of 285° C. at an extrusion rate of 10 g/min. The spun fibers were collected on a conveyer and rolled to obtain a non-oriented non-woven fabric having a basis weight of 10 g/m$^2$ and a fineness of 1 denier.

Using terephthalic acid in an amount of 86 mol % and isophthalic acid in an amount of 14 mol % as the acid components, and ethylene glycol as the glycol component, a polyester copolymer containing ethylene terephthalate units and ethylene isophthalate units was prepared. The copolymer was supplied to a melt extruder and was extruded into the form of a sheet through a die in the form of slit. The extruded sheet was cooled and solidified to obtain a non-oriented sheet. The obtained non-oriented sheet was stretched to 3.3 times the original length in the longitudinal direction and then stretched to 3.6 times original length in the transverse direction, followed by heatset at 120° C. to obtain a polyester film with a thickness of 2 μm.

The obtained polyester film was directly adhered with the non-woven fabric by using a pressure roll without using an adhesive. The film surface of the stencil was coated with a silicone oil in an amount of 0.05 g/m$^2$ to obtain the final stencil. The peeling strength of the obtained stencil was less than 1 g/cm and wrinkles and breakages were observed during the transportation of the film.

Comparative Example 4

The same procedure as in Comparative Example 3 was repeated except that the adhesion of the non-woven fabric with the polyester film was carried out using an adhesive, to obtain a final stencil. Although the peeling strength was 40 g/cm, white spots were observed in some of the circles painted in black and the evaluation of the image quality was "X".

Examples 6–9

The same procedure as in Example 4 was repeated except that the thickness of the polyester film in the stencil and the basis weight of the polyester non-woven fabric were changed as shown in Tables 5 and 6, to obtain final stencils. The film-forming properties were good and evaluations of the image quality were "○".

Example 10

Polyethylene terephthalate material ([η]=0.66, melting point: 255° C.) was spun by melt blown process using a rectangular spinneret having 1000 holes with a diameter of 0.25 mm at a spinneret temperature of 295° C. at an extrusion rate of 1000 g/min. The spun fibers were dispersedly collected on a conveyer using an air ejector at a spinning rate of 2500 m/min to obtain a non-woven fabric having a low degree of orientation, a basis weight of 120 g/m$^2$ and a fineness of 2 deniers. The same procedure as in Example 4 was repeated except that the non-woven fabric having a low degree of orientation was employed as the non-woven fabric, to obtain a final stencil.

Wrinkles and breakages during the film formation were not observed and the film-forming property was good. The peeling strength was 4 g/cm and the evaluation of the image quality of this stencil was also "○".

TABLE 1

| | Polyester Film in Stencil<br>Composition<br>Thickness | Polyester Fibers in Stencil<br>Characteristics of Fibers |
|---|---|---|
| Example 1 | Polyester copolymer of hexamethylene terephthalate and cyclohexanedimethylene terephthalate<br>2 μm | Polyethylene terephthalate<br>100-mesh × 100-mesh<br>Screen gauze |
| Example 2 | Polyester copolymer of hexamethylene terephthalate and cyclohexanedimethylene terephthalate<br>2 μm | Polyethylene terephathalate<br>longitudinal 110-mesh, transverse 100-mesh<br>Screen gauze |

TABLE 1-continued

| | Polyester Film in Stencil<br>Composition<br>Thickness | Polyester Fibers in Stencil<br>Characteristics of Fibers |
|---|---|---|
| Example 3 | Polyester copolymer of ethylene terephthalate and ethylene isophthalate<br>2 μm | Polyethylene terephthalate<br>100-mesh × 100-mesh<br>Screen gauze |
| Comparative Example 1 | Polyester copolymer of hexamethylene terephthalate and cyclohexanedimethylene terephthalate<br>2 μm | Polyethylene terephthalate<br>100-mesh × 100-mesh<br>Screen gauze |
| Comparative Example 2 | Polyester copolymer of hexamethylene terephthalate and cyclohexanedimethylene terephthalate<br>2 μm | Polyethylene terephthalate<br>100-mesh × 100-mesh<br>Screen gauze |

TABLE 2

| | Adhesion between Film and Fibers | Stretching | Peeling Strength g/cm | Image Quality of Stencil | Stability in Film-formation |
|---|---|---|---|---|---|
| Example 1 | Thermal adhesion | Uniaxial co-stretching | 40 | O | good |
| Example 2 | Thermal adhesion | Biaxial co-stretching | 55 | O | good |
| Example 3 | Thermal adhesion | Uniaxial co-stretching | 35 | O | good |
| Comparative Example 1 | Adhered by adhesive | Adhered after stretching | 60 | X | good |
| Comparative Example 2 | Thermal adhesion | Adhered after stretching | less than 1 | O | bad |

TABLE 3

| | Polyester Film in Stencil<br>Composition<br>Thickness | Polyester Fibers in Stencil<br>Characteristics of Fibers |
|---|---|---|
| Example 4 | Polyester copolymer of ethylene terephthalate and ethylene isophthalate<br>2 μm | Polyethylene terephthalate<br>Basis Weight 10 g/m$^2$, Fineness 0.2 deniers<br>Non-woven Fabric |
| Example 5 | Polyester copolymer of ethylene terephthalate and ethylene isophthalate<br>2 μm | Polyethylene terephthalate<br>Basis Weight 10 g/m$^2$, Fineness 0.5 deniers<br>Non-woven Fabric |
| Comparative Example 3 | Polyester copolymer of ethylene terephthalate and ethylene isophthalate<br>2 μm | Polyethylene terephthalate<br>Basis Weight 10 g/m$^2$, Fineness 1 denier<br>Non-woven Fabric |
| Comparative Example 4 | Polyester copolymer of ethylene terephthalate and ethylene isophthalate<br>2 μm | Polyethylene terephthalate<br>Basis Weight 10 g/m$^2$, Fineness 1 denier<br>Non-woven Fabric |

TABLE 4

| | Adhesion between Film and Fibers | Stretching | Peeling Strength g/cm | Image Quality of Stencil | Stability in Film-formation |
|---|---|---|---|---|---|
| Example 4 | Thermal adhesion | Biaxial co-stretching | 40 | O | good |
| Example 5 | Thermal adhesion | Uniaxial co-stretching | 7 | O | good |
| Comparative Example 3 | Thermal adhesion | Adhered after stretching | less than 1 | X | bad |
| Comparative Example 4 | Adhered by adhesive | Adhered after stretching | 40 | X | bad |

TABLE 5

| | Polyester Film in Stencil Composition Thickness | Polyester Fibers in Stencil Characteristics of Fibers |
|---|---|---|
| Example 6 | Polyester copolymer of ethylene terephthalate and ethylene isophthalate 4 μm | Polyethylene terephthalate Basis Weight 10 g/m$^2$, Fineness 0.2 deniers Non-woven Fabric |
| Example 7 | Polyester copolymer of ethylene terephthalate and ethylene isophthalate 1 μm | Polyethylene terephthalate Basis Weight 10 g/m$^2$, Fineness 0.2 deniers Non-woven Fabric |
| Example 8 | Polyester copolymer of ethylene terephthalate and ethylene isophthalate 2 μm | Polyethylene terephthalate Basis Weight 10 g/m$^2$, Fineness 0.2 deniers Non-woven Fabric |
| Example 9 | Polyester copolymer of ethylene terephthalate and ethylene isophthalate 2 μm | Polyethylene terephthalate Basis Weight 10 g/m$^2$, Fineness 0.2 deniers Non-woven Fabric |
| Example 10 | Polyester copolymer of ethylene terephthalate and ethylene isophthalate 2 μm | Polyethylene terephthalate Basis Weight 10 g/m$^2$, Fineness 2 deniers Non-woven Fabric |

TABLE 6

| | Adhesion between Film and Fibers | Stretching | Peeling Strength g/cm | Image Quality of Stencil | Stability in Film-formation |
|---|---|---|---|---|---|
| Example 6 | Thermal adhesion | Biaxial co-stretching | 40 | ○ | good |
| Example 7 | Thermal adhesion | Biaxial co-stretching | 30 | ○ | good |
| Example 8 | Thermal adhesion | Biaxial co-stretching | 25 | ○ | good |
| Example 9 | Thermal adhesion | Biaxial co-stretching | 50 | ○ | good |
| Example 10 | Thermal adhesion | Biaxial co-stretching | 40 | ○ | good |

INDUSTRIAL AVAILABILITY

As described above, since the heat-sensitive mimeograph stencil according to the present invention does not employ an adhesive while the adhesion between the film and the porous support is good, various problems due to the use of an adhesive, such as prevention of permeation of printing ink, softening and swelling of the adhesive by printing ink, melt sticking of the adhesive to thermal head, and generation of toxic gas during processing are overcome. Therefore, the heat-sensitive mimeograph stencil according to the present invention has excellent clearness of image and excellent stability in film-formation, so that the heat-sensitive mimeograph stencil and process for producing the same according to the present invention may be widely used.

We claim:

1. A heat-sensitive mimeograph stencil which is prepared by thermally adhering together a polyester film and a porous support consisting essentially of polyester fibers into a laminate and then co-stretching said laminate, the peeling strength between said polyester film and said porous support being not less than 1 g/cm.

2. The heat-sensitive mimeograph stencil according to claim 1, wherein said peeling strength between said film and said porous support is not less than 3 g/cm.

3. The heat-sensitive mimeograph stencil according to claim 1, wherein said peeling strength between said film and said porous support is not less than 10 g/cm.

4. The heat-sensitive mimeograph stencil according to claim 1, wherein said porous support is a non-woven fabric or a woven-fabric.

5. The heat-sensitive mimeograph stencil according to claim 1, wherein said porous support is a non-woven fabric.

6. The heat-sensitive mimeograph stencil according to claim 1, wherein said porous support is a woven fabric.

7. The heat-sensitive mimeograph stencil according to claim 1, wherein said porous support after being adhered with said polyester film and after said co-stretching has a basis weight of 1–30 g/m$^2$.

8. The heat-sensitive mimeograph stencil according to claim 1, wherein said porous support after being adhered with said polyester film and after said co-stretching has a basis weight of 2–20 g/m$^2$.

9. The heat-sensitive mimeograph stencil according to claim 1, wherein said polyester film after being adhered with said porous support and after said co-stretching has an average thickness of 0.1–10 μm.

10. The heat-sensitive mimeograph stencil according to claim 1, wherein said polyester film after being adhered with said porous support and after said co-stretching has an average thickness of 0.2–3 μm.

11. The heat-sensitive mimeograph stencil according to claim 1, wherein said polyester film after being adhered with said porous support and after said co-stretching has an average thickness of 0.2–1.5 μm.

12. The heat-sensitive mimeograph stencil according to claim 1, wherein said porous support after being adhered with said polyester film and after said co-stretching has a fineness of 0.01–10 deniers.

13. A process for producing a heat-sensitive mimeograph stencil comprising the steps of thermally adhering together a polyester film and a porous support consisting essentially of polyester fibers to form a laminate and then co-stretching said laminate such that the peeling strength between said polyester film and said porous support is not less than 1 g/cm.

14. The process according to claim 13 further comprising heatsetting the resulting co-stretched laminate.

15. The process according to claim 14 wherein said heatsetting is performed at a temperature of 160°–240° C.

16. The process according to claim 14 wherein said heatsetting is performed for a duration of 0.5–60 seconds.

17. The process according to claim 14 wherein the resulting heatset, co-stretched laminate is cooled to about room temperature and then aged.

18. The process according to claim 17 wherein said aging is performed at 40°–90° C.

19. The process according to claim 17 wherein said aging is performed for 10 minutes to one week.

20. A heat-sensitive mimeograph stencil which is prepared by thermally adhering together a polyester film and a porous support consisting essentially of polyester fibers to form a laminate and then co-stretching said laminate, the peeling strength between said polyester film and said porous support being not less than 1 g/cm and wherein at least ⅕ of the diameter of the fibers at an adhered portion of the support is adhered to the film.

21. A process for producing a heat-sensitive mimeograph stencil comprising the steps of thermally adhering together a polyester film and a porous support consisting essentially of polyester fibers to form a laminate and then co-stretching said laminate such that at least ⅕ of the diameter of the fibers at an adhered portion of the support is adhered to the film and the peeling strength between said polyester film and said porous support is not less than 1 g/cm.

22. The process according to claim 13 wherein said co-stretching is performed at a ratio of 2.0–5.0 times the original length of the laminate in either of the longitudinal or traverse direction.

* * * * *